(12) United States Patent
Veltkamp

(10) Patent No.: US 8,137,784 B2
(45) Date of Patent: Mar. 20, 2012

(54) VACUUM INSULATION PANEL

(75) Inventor: Wessel Bart Veltkamp, Son (NL)

(73) Assignee: Level Holding B.V. (NL)

( * ) Notice: Subject to any disclaimer, the term of this patent is extended or adjusted under 35 U.S.C. 154(b) by 1351 days.

(21) Appl. No.: 10/992,229

(22) Filed: Nov. 19, 2004

(65) Prior Publication Data

US 2005/0144904 A1    Jul. 7, 2005

(30) Foreign Application Priority Data

Nov. 19, 2003    (NL) ...................................... 1024810

(51) Int. Cl.
*B32B 5/00*    (2006.01)
*E04C 1/00*    (2006.01)
*E04C 2/34*    (2006.01)

(52) U.S. Cl. .......................... 428/98; 52/309.9; 52/794.1

(58) Field of Classification Search ............. 220/592.26, 220/592.27; 428/75, 74, 76, 98, 105; 52/309.9, 52/794.1; 137/375
See application file for complete search history.

(56) References Cited

U.S. PATENT DOCUMENTS

| | | | |
|---|---|---|---|
| 3,161,265 A | 12/1964 | Matsch et al. | |
| 4,359,496 A * | 11/1982 | Kratel et al. | 428/75 |
| 4,606,196 A | 8/1986 | Acharya et al. | |
| 5,137,169 A | 8/1992 | Schulz et al. | |
| 5,601,897 A * | 2/1997 | Vermilion et al. | 428/69 |
| 5,798,154 A | 8/1998 | Bryan | |
| 5,897,932 A * | 4/1999 | McGarth et al. | 428/69 |
| 6,001,450 A * | 12/1999 | Tanimoto et al. | 428/69 |
| 6,379,817 B2 * | 4/2002 | Kufferath | 428/608 |
| 6,694,702 B2 * | 2/2004 | Weymer et al. | 52/784.1 |
| 2002/0170265 A1 * | 11/2002 | Tokonabe et al. | 52/784.1 |
| 2004/0048049 A1 * | 3/2004 | Merrill et al. | 428/209 |
| 2004/0105953 A1 * | 6/2004 | Nowara | 428/69 |

OTHER PUBLICATIONS

European Search Report, EP 04 07 8182 dated May 18, 2005.

* cited by examiner

*Primary Examiner* — Bryon Gehman
*Assistant Examiner* — Shawn Braden
(74) *Attorney, Agent, or Firm* — Banner & Witcoff, Ltd.

(57) ABSTRACT

A housing with a first main wall and a second main wall which each extend perpendicularly of a temperature gradient, and auxiliary walls connecting both main walls and extending parallel to the temperature gradient, wherein the auxiliary walls connect with ribs to the main walls, and a filling placed in the housing and able to withstand pressure forces, wherein the pressure within the housing is reduced to a value at which no heat transfer of any significance takes place, and wherein the housing is manufactured from metal, wherein a strip of the auxiliary wall contacting a rib is welded to the main wall, and that a welding strip is welded onto the weld. With mere welding of a sufficiently thin metal foil it is practically impossible to obtain a weld of sufficient quality. With a sandwich weld it is possible to obtain a sufficiently strong and reliable welded connection, even when a very thin metal foil is used as auxiliary wall.

16 Claims, 10 Drawing Sheets

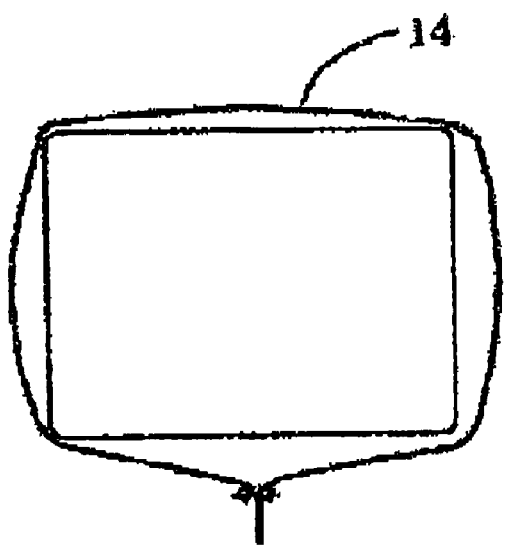 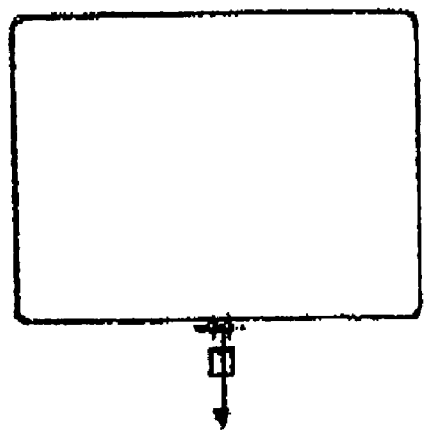
FIGURE 6A  FIGURE 6B

VACUUM INSULATION PANEL

Applicants herewith claim the benefit of Dutch Patent Application No. NL 1024810 filed Nov. 19, 2003.

The invention relates to a thermal insulation panel, comprising a housing with a first wall and a second main wall which each extend perpendicularly of a temperature gradient, and auxiliary walls connecting both main walls and extending parallel to the temperature gradient, wherein the auxiliary walls connect with ribs to the main walls, and a filling placed in the housing and able to withstand pressure forces, wherein the pressure within the housing is reduced to a value at which no heat transfer by gas conduction takes place and wherein the housing is manufactured from metal.

Such a thermal insulation panel is known from European patent application EP-A-0 857 833.

The filling is chosen such that hardly any heat conduction takes place therethrough in the solid material or due to radiation. Heat conduction does however take place through the auxiliary walls. It is therefore important to make these as thin as possible, for instance from a metal foil.

In this insulation panel known from the prior an the auxiliary walls and the main walls are mutually connected by welds extending over the ribs. The portions connecting onto the ribs are herein thickened in order to allow welding on the ribs while retaining a thin auxiliary wall.

Experience has shown that the quality of such welds is not sufficient to ensure a long lifespan of the insulation panel. A minimum lifespan of 50 years is usually required here, which makes particularly high demands of the welded connection in order to sustain the vacuum over this long period.

The object of the present invention is to provide such an insulation panel wherein a weld of a sufficient quality to sustain the vacuum for a long period is obtained, wherein the weld is easily reproducible and wherein the good insulating properties are nevertheless preserved.

This object is achieved in that a part of the auxiliary wall contacting a rib is welded to the main wall while connecting to a rib, and that a welding strip is welded onto the weld.

With mere welding of a sufficiently thin metal foil it is practically impossible to obtain a weld of sufficient quality. With a sandwich weld it is possible to obtain a sufficiently strong and reliable welded connection, even when a very thin metal foil is used as auxiliary wall. The reproducibility of the welded connection is also improved, so that a robust production process results.

Through the use of the welding strips the thermal conductivity in the direction of the temperature gradient is of course increased. The disadvantageous effects hereof can be avoided by making the metal foil sufficiently thin and wide. This is related to the fact that a considerable piece of metal foil, this being the most important material which can ensure heat transfer in the relevant direction, is present between the two welding strips in the direction of the temperature gradient.

According to a preferred embodiment, the auxiliary walls are formed by a piece of metal foil with a thickness between 10 μm and 50 μm.

It is found that the welding process can be readily performed here, while the heat transfer is extremely minimal.

It is noted here that it is possible in principle to apply metal foil of a different thickness, such as a thickness between 15 μm and 40 μm and 20 μm or 30 μm. It is also possible to choose a piece of metal foil with a thickness between 5 μm and 100 μm or between 2 μm and 500 μm. The above stated lower and upper limits can be combined with each other.

It has further been found by the inventor that stainless steel has attractive properties for use as metal foil for this application. It does after all have a low coefficient of heat conduction, it is strong, and can be readily welded. Other metals, such as titanium, are however by no means precluded.

Another preferred embodiment provides the measure that the material of the welding strip is the same as the material of the main wall.

As a result of this measure the welding process acquires a certain symmetry relative to the foil. The foil is after all enclosed between the material of the main wall and the—as a result of this measure—identical material of the welding strip. This symmetry has the effect of improving the quality of the welding process. Particularly avoided are problems such as the foil burning through when it is not properly placed on the skirt.

Yet another embodiment provides the measure that the filling material is formed by an open-cell material with small cavities.

The designation "small" must here be understood to mean so small that the free path length of the remaining molecules in the vacuum generated in the filling material is greater than the dimension of the cavities. Heat transfer through gas conduction is hereby limited as much as possible.

When this embodiment is applied, it is attractive that the filling material is provided with evacuation channels on at least a surface extending transversely of the direction of the temperature gradient.

As a result of the small dimensions of the cells of the filling material, not only is the transfer of thermal energy limited as much as possible, but the transport of the molecules per se is also greatly limited. Complete evacuation of the filling material would hereby take a relatively long time. By arranging those channels the evacuation time is considerably shortened, since the distance over which molecular flow takes place in the filling material is considerably shortened and the flow in the evacuation channels is still kept laminar.

Depending on the chosen material, the arranging of such channels in the open-cell material is not always easy; some materials are difficult to process. In order to maintain a free choice of filling material, it can be attractive to arrange the evacuation channels in a separate body, manufactured for instance from a material that is easy to process. Because such a separate body only extends over a short length in the temperature gradient, the adverse effect thereof on the thermal insulation is limited.

According to another preferred embodiment, the filling material comprises fibres, preferably glass fibres, extending substantially parallel to the main walls. A very low thermal resistance hereby becomes possible, together with a simple production process.

In order to make fixing of the panel as easy as possible, at least one fixing bracket is attached by means of welding to at least one of the main walls.

The thermal insulating properties are hardly affected by the welding to the main walls.

In many cases there is a need for a rectangular insulation panel. For this purpose the invention provides the measure that the housing takes the form of a block and that the main walls are flat.

The temperature gradient herein extends perpendicularly of the main plane of the block so that the block can easily be used as building component for thermally insulated spaces. According to the invention the weld is arranged on the auxiliary walls connecting onto the ribs.

In order to have a surface to which the foil and the welding strip can be welded, the main walls can be bent at their edges in order to form a skirt. This is then welded to the auxiliary walls.

In order to increase the thermal resistance as much as possible the skirt can be deep-drawn to a thinner dimension. This measure results in a thin skirt with a high heat resistance.

Instead of bending the edges of the main walls, it is also possible for a skirt to be formed on the main walls by an angle profile connected to the main wall by welding. The auxiliary walls are then welded thereto.

The angle profile will generally be connected to the part of the main walls adjacent to the ribs of the main walls. It is also possible that the main walls extend outside the auxiliary walls and that the angle profile is fixed to the part of the main wall protruding outside the auxiliary wall.

Such a collection is preferably applicable in insulation panels which are used as covering panels for outside walls. In this case the protruding pats of the at least one main wall serve to cover the supporting structure for the panels.

A further embodiment provides the measure that the main walls comprise rounded corners.

This measure relates to the method applied for welding the foil. The foil is herein preferably placed around the assembly of the filling and the main walls, and the foil is then tightened. The corners of the main walls are preferably rounded in order to facilitate this tightening and sliding of the foil over the skirts of the auxiliary walls.

A thermal insulation panel according to the present invention can also be assembled from different panels. Depending on the chosen application, such composite panels may be desired, again for instance as outer wall covering panel.

Such a composite insulation panel is preferably formed from a number of panels placed with parallel main surface onto each other, wherein the mutually adjacent main walls are combined into a single intermediate wall. This assembly provides the option of reducing the intermediate wall to a wall extending between the auxiliary walls.

It is however possible to envisage situations, for instance in the thermal insulation of pipes, where it is attractive that the insulation panel has the form of the jacket of a circular cylinder, that the temperature gradient extends radially and that the main surfaces are placed concentrically, wherein the temperature gradient extends radially.

In such a configuration it is attractive when the filling material is formed by winding a fibre.

This has the advantage that fibres which lie on each other and mutually intersect at an angle have a very small contact surface, whereby the thermal conduction via the solid material is extremely low.

During the winding the tension in the fibre can be controlled such that after evacuation of the pipe, the tension in the product is minimal and the form purely cylindrical.

A large number of windings will in general be necessary, so that the stochastic variation in thickness of the fibre is hardly translated into a variation in thickness of the filling. A further resulting advantage is that the fibre consists of one whole, so that no ends protrude on the end surfaces, and the danger of fibres entering the weld is limited.

The fibres are preferably formed by glass fibres.

When this configuration is applied, it is structurally attractive that the auxiliary walls are annular and that an outward extending skirt is formed by bending on the outer edge and the inner edges which skirt is welded to the main walls.

Another preferred embodiment provides the measure that evacuation channels extending in axial direction are formed in the outer wall, for axially welding to each other.

These channels also serve to cause a defined deformation to occur over the periphery during evacuation.

It is however most attractive when the skirts of the auxiliary walls are welded against the inner surface of the main walls. In this case the weld to be made between the auxiliary wall and the internal cylinder is more readily accessible.

The same method of winding the fibres can also be applied for the flat panels, by building up the tension such that, after axial severing of the wound filling, it extends practically flat.

Another preferred embodiment provides the measure that the panel has the structure of an insulating box open on one side, wherein the walls corresponding with the auxiliary walls extend parallel to the plane of the open side.

It is also attractive to bend the edge of one of the main walls such that a thin auxiliary wall results which is at a right angle to the main wall, which in turn has at a right angle thereto a strip with the original thickness which serves as welding strip.

Such a configuration is for instance attractive in a refrigerator.

Use can also be made herein of the measures according to the invention.

The invention not only relates to a thermal insulation panel in diverse configurations, but also relates to a method for manufacturing a thermal insulation panel.

This method comprises the following steps of:
providing both main walls with a skirt extending in the direction of the temperature gradient;
placing on each other a lower main wall, the filling and the upper main wall;
arranging a foil, from which the auxiliary wall must be formed, around the thus formed assembly;
welding the foil to the skirts; and
evacuating the thus resulting panel, wherein the foil is welded to the skirts while adding a welding strip.

In order to prevent stresses during the welding as far as possible, the foil is welded simultaneously to both the skirts adjacent to the foil i.e. the skirt of the upper main wall and the skirt of the lower main wall. The foil strip is hereby loaded symmetrically, so that warping is prevented.

In order to improve the control over the welding process as much as possible, the welding takes place by means of laser welding.

The foil is preferably pulled tight and a vacuum is applied before welding commences. A good contact is hereby obtained between the foil at the position to be welded and the skirts of the main walls, and the upper surface is positioned relative to the lower surface such that the variation of the edge position, taken as a whole over the periphery, is minimal.

During welding the foil is attached to the workpiece. It is then no longer possible to tauten both ends of the foil, although it is then still attractive for the loose end of the foil to be pulled tight during the welding, whereby a rigid sandwich panel is created which, due to the compression of the filling material, already has the form of the final product, so that tie stresses are minimized. By having application of the vacuum and tensioning of the foil take place simultaneously and adapting these to each other, the foil remains undeformed.

In order to ensure the form retention of the workpiece during welding, the lower main wall is placed on a vacuum table prior to the welding. Furthermore, a vacuum is preferably applied to the interior of the panel during welding.

The invention also relates to a method for manufacturing thermal insulation panel of the above stated type, wherein prior to placing of the filling, the filling is formed by winding a fibre around a core, cutting through the thus formed fibre package in radial-axial direction to the winding core.

During winding the tension in the fibre is preferably controlled for winding the fibre with a tension such that the tension in the fibres is substantially the same at cutting. The windings present on the outside of the wrapping will after all have a greater length an those on the inside. This difference can be compensated by controlling the tension.

This tension control can be carried out using a method wherein the tension in the fibres is controlled by subjecting the fibres to an increase in temperature. This is particularly attractive when the fibres are formed by glass fibres. Glass fibres are supplied with a coating which is not wanted for the application in the present invention. This coating is burned off by the heating.

Other attractive preferred embodiments are stated in the remaining sub-claims.

The present invention will be elucidated hereinbelow with reference to the annexed figures, in which:

FIG. 6a is a horizontal cross-sectional view of the insulation panel according to the invasion during arranging of the foil;

FIG. 6b is a view corresponding with FIG. 6a after the foil has been arranged;

Figure 1:
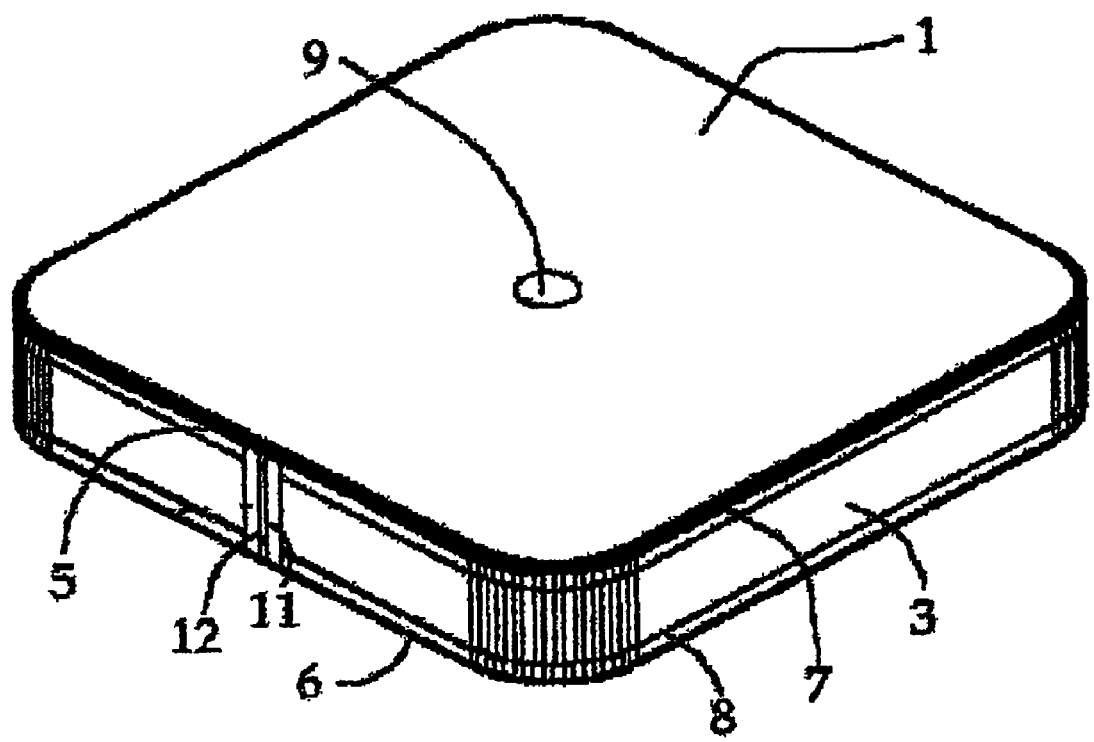
FIG. 1 is a schematic perspective view of an insulation panel according to the present invention.

The insulation panel shown in FIG. 1 is formed by an upper main wall 1 and a lower main wall 2 which is not visible in FIG. 1, wherein both main walls are mutually connected by a metal foil 3 extending all around. A filling 4 is arranged between lower main wall 2 and upper main wall 1, and surrounded by the metal foil.

Figure 2:
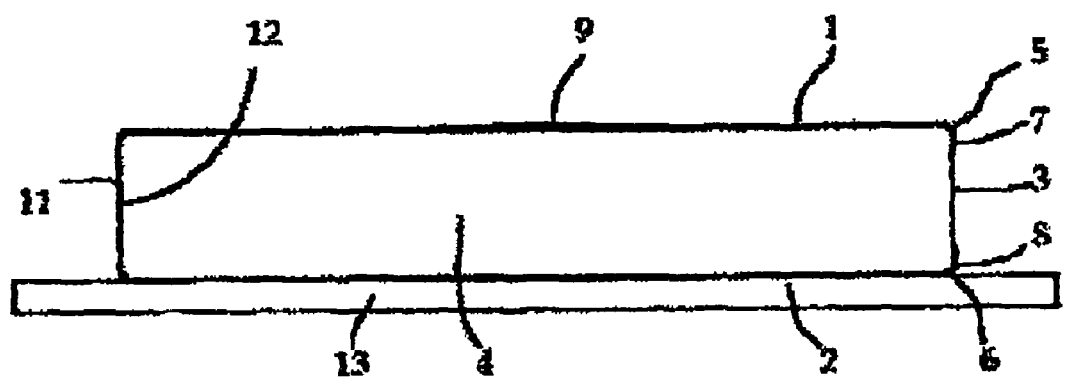
FIG. 2 is a partly cross-sectional view of the insulation panel shown in FIG. 1.

As shown in, among others, FIG. 2, metal foil 3 is welded to a bent skirt 5 of upper main wall 1 and a bent skirt 6 of lower main wall 2. In order to improve the quality of the weld between the bent skirt 5 and metal foil 3, and between the bent skirt 6 and metal foil 3, a strip 7, 8 respectively is arranged roughly coinciding with the bent skirts 5, 6. This strip serves for better control of the welding process.

A vacuum is created in the completed vacuum panel. This vacuum is already partly created during the tightening of the metal foil and partly created after the panel is manufactured, wherein the gases present in the interior are partly removed through an opening arranged in upper main wall 1. The opening in question is then closed by means of a cover plate 9. This is welded onto upper main wall 1. It will be apparent that in order to obtain a vacuum-tight envelope with a sufficient lifespan, the welds must be up to the high standards. In order to increase the insulating value of the panel as much as possible, foil 3 is preferably as thin as possible, and preferably manufactured from metal with low conduction, such as stainless steel, titanium or an appropriate alloy.

In the embodiment described with reference to FIG. 1 and 2, skirt 5, 6 is obtained by bending an edge of the upper main wall 1, respectively the lower main wall 2, although it is also possible instead to weld on an angle profile. In general it is easy to make a welded connection with main walls 1, 2 since these are manufactured from thicker material than the foil.

The angle profile can be placed on the inside of the outer edge of main walls 1, 2. A configuration then results which differs little from the configuration shown in FIGS. 1 and 2.

It is however also possible to have both walls 1, 2, or one hereof, extend slightly beyond the wall, which in the present case is formed by foil, whereby a protruding flange is obtained which can for instance be used to cover a frame.

Figure 3:
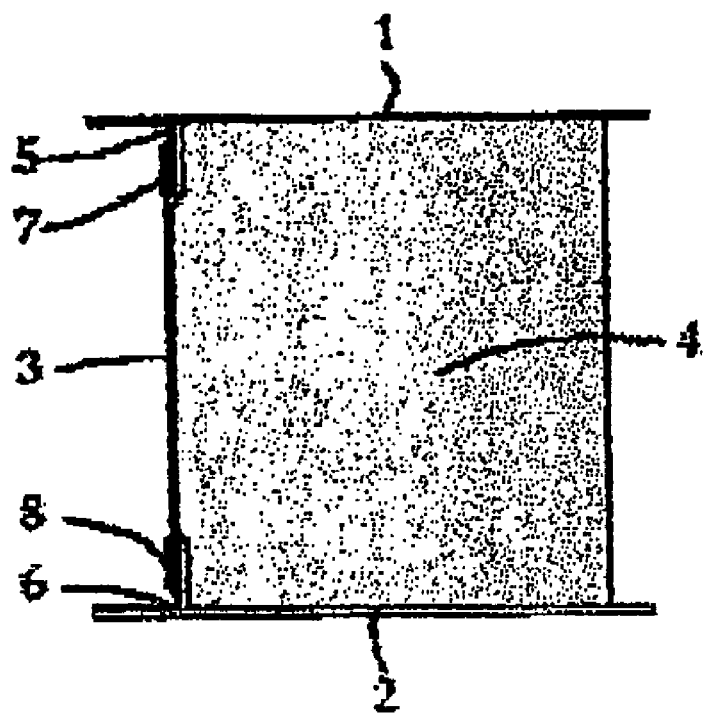
FIG. 3 is a cross-sectional view corresponding with FIG. 2 of another embodiment of the insulation panel according to the invention.

In such a situation the profile can also be arranged on the outside, as shown in FIG. 3. In some situations it may be attractive to make use of a composite wall configuration.

Figure 4:
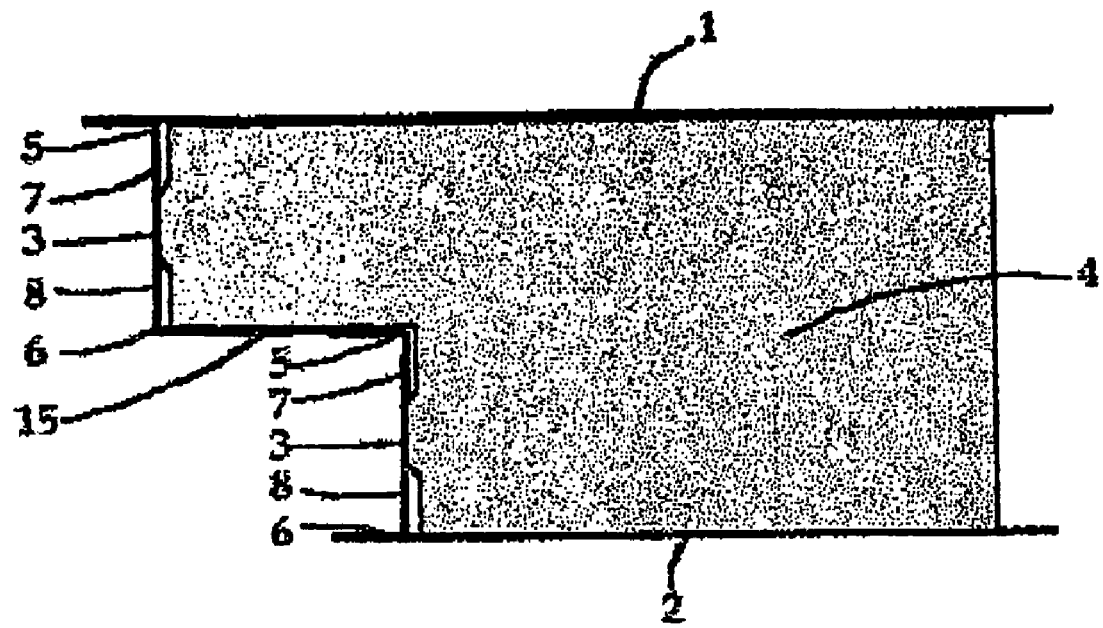
FIG. 4 is a cross-sectional view corresponding with FIGS. 2 and 3 of yet another embodiment of the insulation panel.

It is possible to envisage constructing such a configuration from two insulation panels stacked one on the other. A single wall can herein be present between the two panels, but this separating wall can also be embodied as a ring which covers only that part of the larger panel that is not covered by the smaller panel. A cross-section of such a configuration is shown in FIG. 4.

It will be apparent that such a configuration can take numerous forms; it can for instance be round, rectangular or, depending on the application, have another random shape. It is furthermore possible to envisage configurations wherein both panels are mutually offset.

In the manufacture of such a panel, starting from the embodiment provided with skirts 5, 6 the lower main wall 1 is initially placed an a vacuum table 13. Filling 4 is than placed thereon, and the upper main surface 1.

A loop 14 is formed around the thus formed assembly from the metal foil 3, as shown in FIG. 6a. This loop 14 is tautened around the assembly by means of a tensioning device, together with applying of a vacuum in the interior of the assembly. The foil will hereby be pulled against the assembly and the filling material will be compressed, so that the foil is situated at the correct position relative to the skirts.

Figure 5:
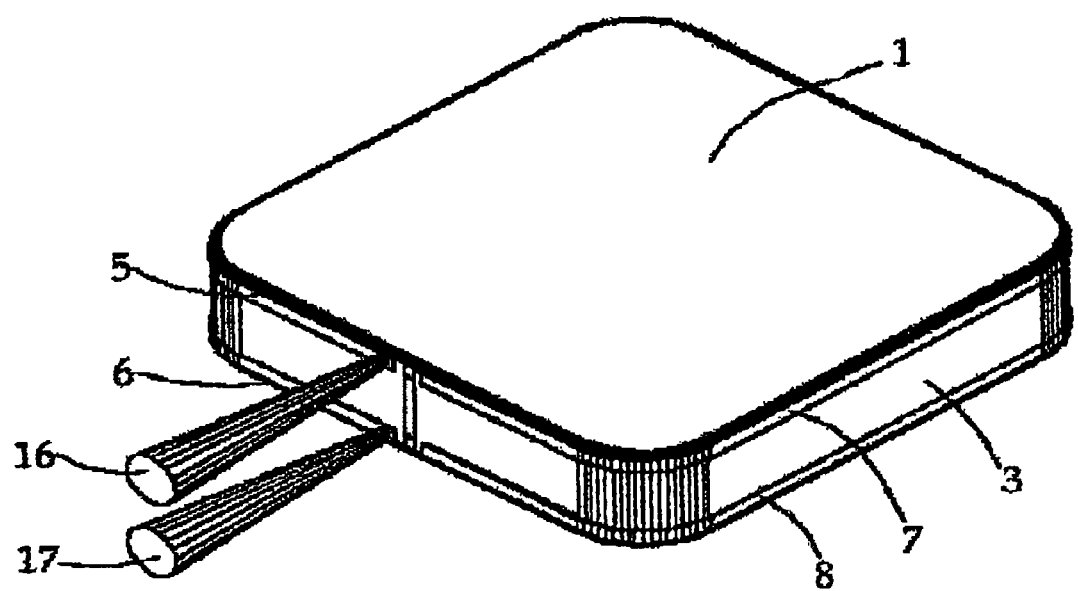
FIG. 5 is a view during welding corresponding with FIG. 1.

The device is then ready to be welded. For this purpose use is preferably made of laser welding devices, owing to the better controllability of the welding process. As shown in FIG. 5, laser weld beams 16, 17 are directed at the elements for connecting, i.e. metal foil 3 and the bent skirt 5 respectively 6. Before the welding process begins, welding strips 7, 8 respectively are arranged and then welded to the insulation panel to be formed. It is herein possible to move the source of the laser welding energy around the workpiece, for instance in that this laser welding source is accommodated in the head of a robot, or by moving the workpiece past the laser welding source.

It is noted here that the corners of the upper and lower main wall and filling 4 are rounded to enable the metal foil to be easily pulled taut around the workpiece. This moreover has the advantage that the foil can easily be pulled tight; the foil will after all move easily along the curved wall parts.

It will further be apparent that, when the welding operation for welding together foil and upper respectively lower wall and the relevant welding strips 7, 8 is completed, the foil and welding strips 7, 8 must be severed and the two ends of foil 3 must be welded together. Use is preferably also made for this purpose of a piece of weld strip, which in this case extends parallel to the temperature gradient and thus forms a potential thermal short-circuit. In order to enable robust welding of the foil with the welding strips, a start and end plate 11, 12 is placed behind the foil and the welding strips, which plate is butt-welded to both skirts 5, 6. In view of the small dimensions of this element, the thermal loss caused thereby is however negligible.

The vacuum panel can then be evacuated to the required end pressure by means of the opening arranged in the upper wall. For this purpose a flushing is initially carried out in order to remove residual material, such as water and the like, which are present in the interior and which can result in contamination when a sufficient vacuum has been created. The flushing steps are preferably carried out successively with lighter gases.

It is furthermore possible to make use of a getter for arranging in the interior. This is not however recommended.

After a sufficient vacuum has been applied, the cover plate 9 is placed on the opening in magnetic manner while maintaining a vacuum, and then welded into place, once again by means of a laser.

A vacuum panel is hereby obtained which combines an exceptionally high insulating value with a long lifespan of at least 50 years, an attractive appearance, so that it is well suited for application as outer wall element, while numerous degrees of freedom are furthermore present for the design thereof.

Figure 7:
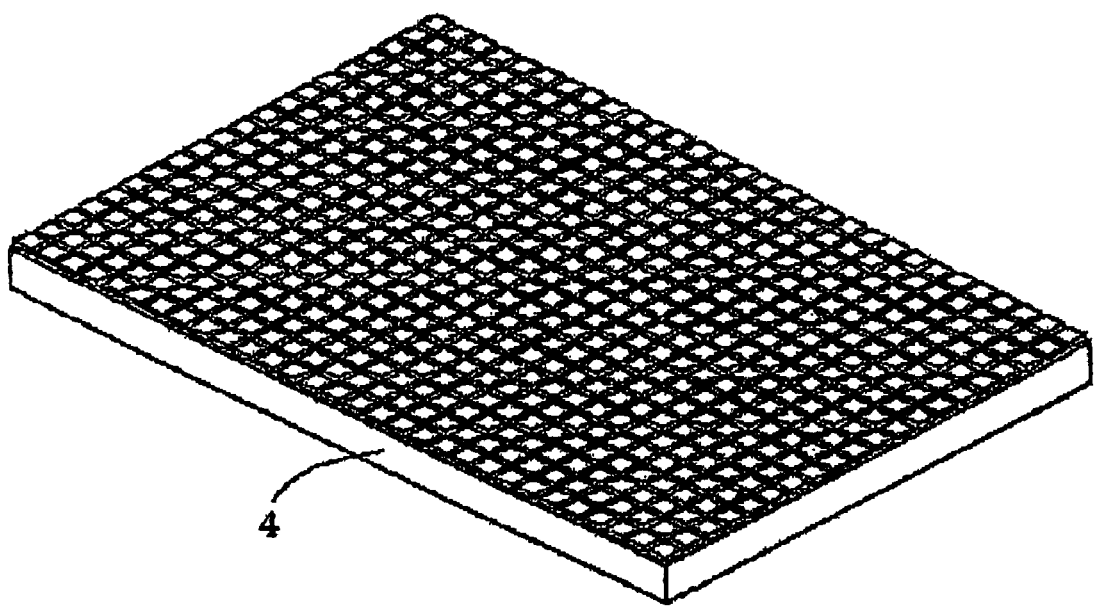
FIG. 7 is a schematic perspective view of a filling according to an attractive embodiment of the invention.

The evacuation of the interior of the vacuum panel is greatly enhanced when the filling of the vacuum panel is provided with evacuation channels as shown in FIG. 7. These preferably extend on that side of the filling to which the evacuation opening connects. These channels are preferably formed by grooves arranged in the filling.

They can however also be embodied as channels extending in the interior of the filling. It is likewise possible to arrange these channels in a separate material, which is then placed on the filling. The material must then be provided with openings, for instance at the positions where the channels intersect, in order to form a connection to the actual filling.

In the embodiments elucidated above the temperature gradient is oriented in each case perpendicularly of the main walls of the panel.

There are applications, for instance for insulating pipes or conduits, wherein the insulation panel preferably has a cylindrical form, wherein the temperature gradient extends in radial direction.

Figure 8:
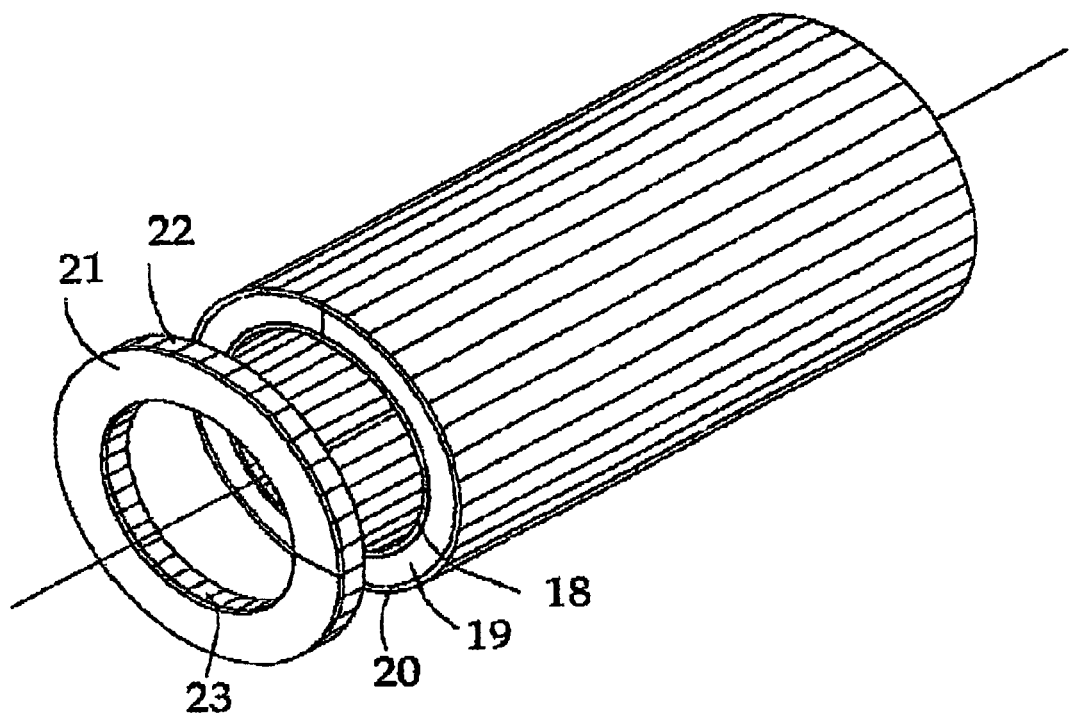
FIG. 8 is an exploded view of an alternative embodiment of the insulation panel according to the present invention.

Such an insulation panel is shown in FIG. 8. It comprises an internal pipe 18 around which a filling of insulating material 19 is placed, which is enclosed on its outside by an external pipe 20. The end surface, which in this case is formed by two rings 21, must be given the thinnest possible form so as to prevent thermal flow. Use can be made for this purpose of the same configuration as in the above stated first embodiment of the invention. Rings are preferably used with a U-shaped configuration, which are then welded to both the internal pipe 18 and to the external pipe 20 while adding strips 22, 23 respectively. These welding strips bring about improvement in the welding quality.

Figure 9:
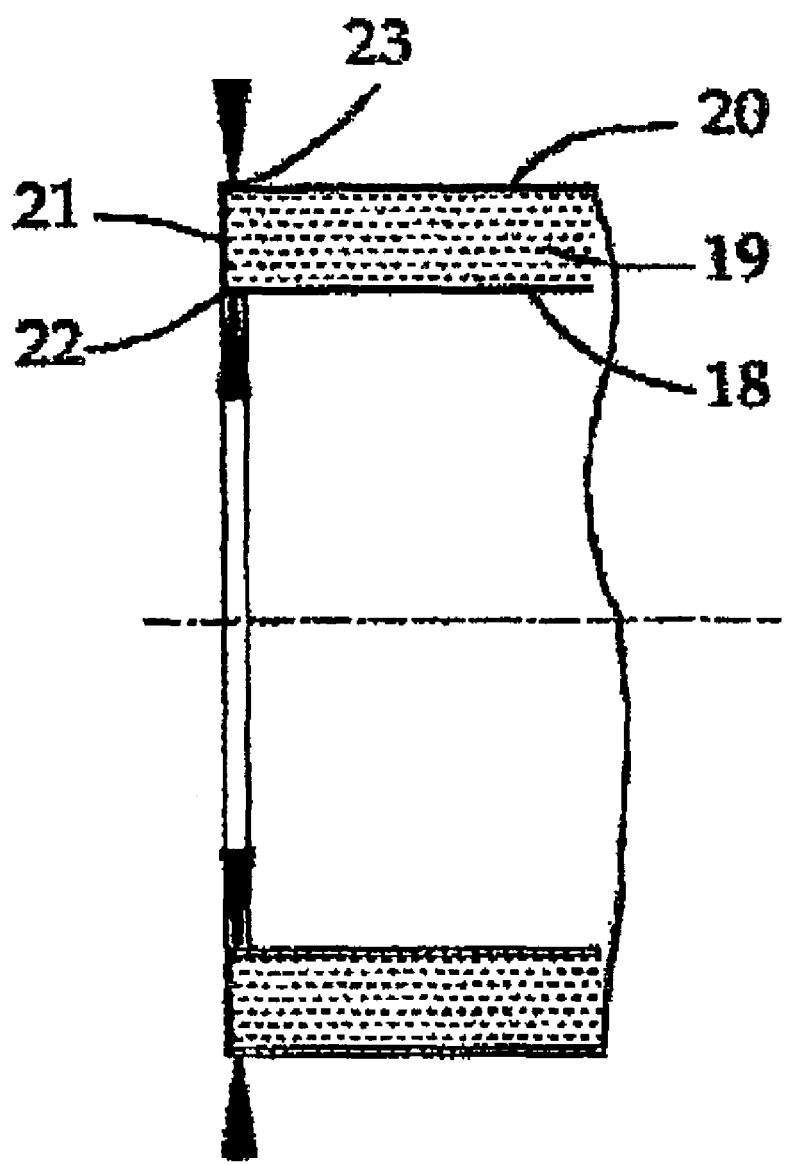
FIG. 9 is a cross-sectional view of the embodiment shown in FIG. 8.

Such a configuration is shown in FIG. 9.

Due to the annular configuration of as panel, use is preferably made of a filling material which is wound from a fibre, for instance a glass fibre. By winding the fibres spirally, the contact surface between the wound parts of the fibres becomes extremely small, so that the heat transfer through the material via heat conduction is very small.

This production method for the filling material can also be applied for the flat panel wherein the fibre is wound onto a sufficiently large cylinder under a tension such that, after axial cutting, the filling material spreads to form a surface. The tension can also be obtained by heating the fibre during winding, which also has the advantage that the coating of the fibre is burned off and the vacuum pump is not contaminated therewith.

Figure 10:
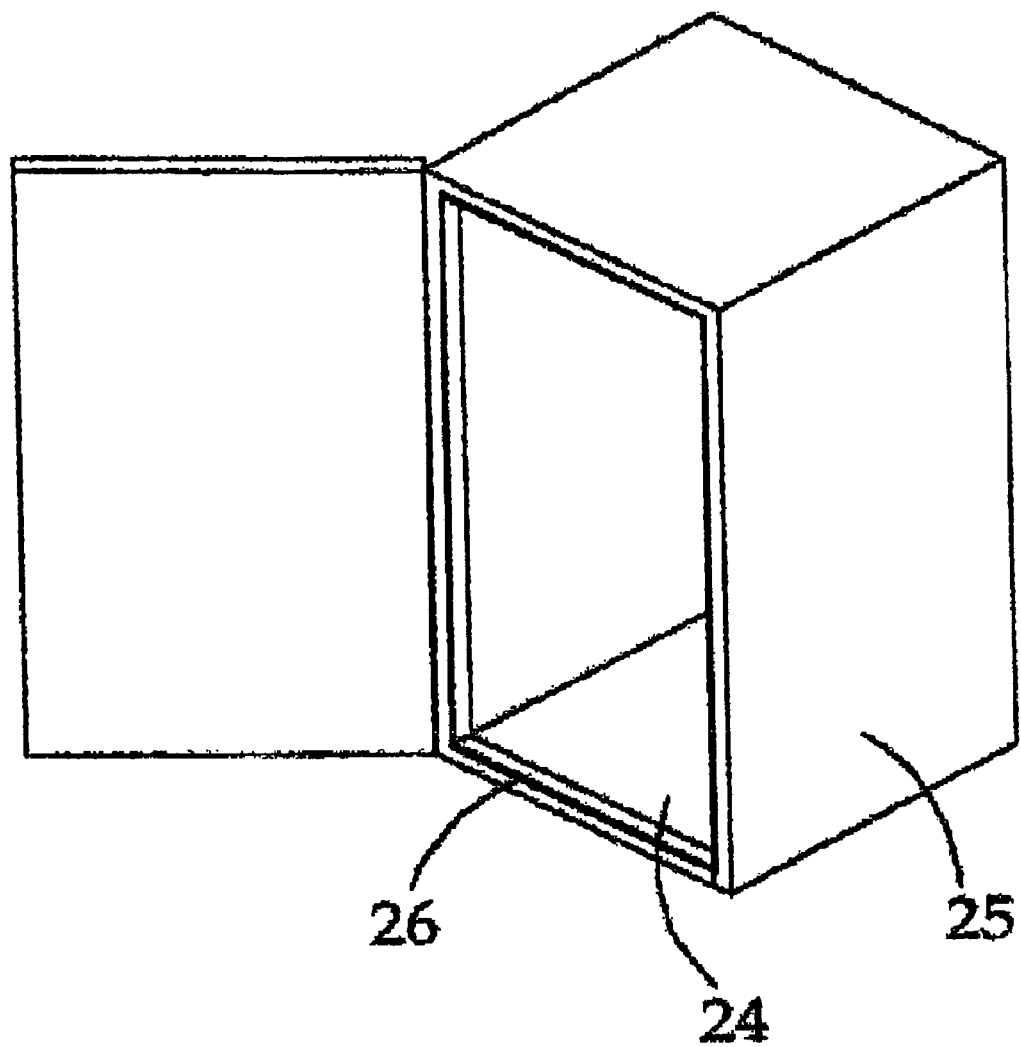
FIG. 10 is a perspective view of an alternative embodiment.

Finally, FIG. 10 shows an alternative embodiment in the form of a cabinet, for instance a refrigerator, wherein the invention is likewise applicable. Here the insulation panel is in the form of a cabinet; also present here are an inner cabinet 24 and an outer cabinet 25, which are mutually connected by a foil strip 26 over which the temperature gradient is present.

The advantages of the invention are also obtained by welding this strip in place in the above described manner.

It will be apparent that numerous variations of the embodiments elucidated above can be realized within the scope of the invention.

The invention claimed is:

1. Thermal insulation panel, comprising:
    a housing with:
    a first main wall and a second main wall which each extend perpendicularly of a temperature gradient, and
    auxiliary walls connecting both main walls and extending parallel to the temperature gradient, wherein the auxiliary walls are welded to edges of the main walls, and
    a filling placed in the housing and able to withstand pressure forces,
    wherein the pressure within the housing has a value at which no heat transfer of any significance takes place,
    wherein the housing is manufactured from metal,
    wherein edges of each main wall are bent over to form skirts;
    wherein each auxiliary wall consists of a metal foil and is welded to the skirts of each main wall at the edges of the main wall to form seams, and
    wherein a welding strip having a width smaller than half the width of the auxiliary walls is arranged over and welded to the seams between the auxiliary walls and the main walls, wherein the auxiliary walls are formed by a piece of said metal foil with thickness between 10 and 50 μm.

2. Thermal insulation panel as claimed in claim 1, characterized in that the metal foil is formed by foil of stainless steel.

3. Thermal insulation panel as claimed in claim 1, characterized in that the material of the welding strip is the same as the material of the main wall.

4. Thermal insulation panel as claimed in claim 1, characterized in that the filling material is formed by an open-cell material with small cavities.

5. Thermal insulation panel as claimed in claim 4, characterized in that the filling material is provided with evacuation channels on at least a surface extending transversely of the direction of the temperature gradient.

6. Thermal insulation panel as claimed in claim 5, characterized in that the evacuation channels are arranged in a body separated from the rest of the filling.

7. Thermal insulation panel as claimed in claim 1, characterized in that the filling material comprises fibers extending substantially parallel to the main walls.

8. Thermal insulation panel as claimed in claim 7, characterized in that the auxiliary walls comprise rounded corners.

9. Thermal insulation panel as claimed in claim 7, characterized in that the fibers are formed by glass fibers.

10. Thermal insulation panel as claimed in claim 1, characterized in that the housing takes the form of a block and that the main walls are flat.

11. Thermal insulation panel as claimed in claim 1, characterized in that the skirt is formed by a deep-drawn process.

12. Thermal insulation panel as claimed in claim 1, characterized in that the main walls extend outside the auxiliary walls and that the angle profile is welded to the part of the main wall protruding outside the auxiliary wall.

13. Thermal insulation panel as claimed in claim 1, characterized in that the insulation panel has the form of the jacket of a circular cylinder that the temperature gradient extends radially and that the main surfaces are placed concentrically.

14. Thermal insulation panel as claimed in claim 13, characterized in that the auxiliary walls are annular and that an outward extending skirt is formed by bending on the outer edge and the inner edge, which skirt is welded to the main walls.

15. Thermal insulation panel as claimed in claim 14, characterized in that the skirts of the auxiliary walls are welded against the inner surfaces of the main walls.

16. Thermal insulation panel as claimed in claim 13, characterized in that the filling material is formed by winding a fiber helically round the inner main wall.

\* \* \* \* \*